US011619329B2

(12) United States Patent
Lee et al.

(10) Patent No.: US 11,619,329 B2
(45) Date of Patent: Apr. 4, 2023

(54) PIPE FOR EASY ASSEMBLY AND SEPARATION AND SUCTION PIPE FOR VACUUM CLEANER INCLUDING THE SAME

(71) Applicant: Byung Dae Lee, Cumming, GA (US)

(72) Inventors: Byung Dae Lee, Cumming, GA (US); Ensam Lee, Brooklyn, NY (US); Enbe Lee, Brooklyn, NY (US)

(73) Assignee: Byung Dae Lee, Cumming, GA (US)

( * ) Notice: Subject to any disclaimer, the term of this patent is extended or adjusted under 35 U.S.C. 154(b) by 96 days.

(21) Appl. No.: 17/208,094

(22) Filed: Mar. 22, 2021

(65) Prior Publication Data

US 2021/0307579 A1    Oct. 7, 2021

(30) Foreign Application Priority Data

Apr. 3, 2020   (KR) .......................... 20-2020-0001147

(51) Int. Cl.
*F16L 37/00* (2006.01)
*F16L 21/08* (2006.01)
*A47L 9/24* (2006.01)
*F16L 21/00* (2006.01)

(52) U.S. Cl.
CPC ............. *F16L 21/08* (2013.01); *A47L 9/242* (2013.01); *F16L 21/00* (2013.01); *F16L 37/004* (2013.01)

(58) Field of Classification Search
CPC ......... F16L 21/08; F16L 21/00; F16L 37/004; F16L 37/24; F16L 37/244; A47L 9/242
USPC ........................................................ 285/7, 9.1
See application file for complete search history.

(56) References Cited

U.S. PATENT DOCUMENTS 3,181,895 A * 5/1965 Cator .................... F16L 37/004
                                                                    285/1
2018/0142822 A1* 5/2018 Felstead ................ F16L 37/133

FOREIGN PATENT DOCUMENTS

| JP | H1170061 A | 3/1999 |
| JP | 2007061198 A | 3/2007 |
| JP | 2013162882 A | 8/2013 |
| KR | 1020090091944 A | 8/2009 |

* cited by examiner

*Primary Examiner* — Aaron M Dunwoody
(74) *Attorney, Agent, or Firm* — Dinsmore & Shohl LLP; Yongsok Choi, Esq.

(57) ABSTRACT

The present disclosure provides a pipe for easy assembly and separation. The pipe for easy assembly and separation according to an embodiment of the present disclosure includes a rear end pipe formed in a cylindrical shape; an insertion pipe located at the other end of the rear end pipe; a front end pipe that is connected to the rear end pipe by inserting the insertion pipe into one end of the front end pipe; a first fixed portion located at one end of the insertion pipe; and a second fixed portion located at the front end pipe to correspond to the first fixed portion when the insertion pipe is inserted into the front end pipe.

8 Claims, 8 Drawing Sheets

PIPE FOR EASY ASSEMBLY AND SEPARATION AND SUCTION PIPE FOR VACUUM CLEANER INCLUDING THE SAME

CROSS-REFERENCE TO RELATED APPLICATIONS

The present application claims priority under 35 U.S.C 119(a) to Korean Patent Application No. 20-2020-0001147, filed on Apr. 3, 2020, which is incorporated herein by reference in its entirety.

BACKGROUND

1. Technical Field

The present disclosure relates to a pipe for easy assembly and separation, and a suction pipe for a vacuum cleaner including the same.

2. Related Art

In general, a vacuum cleaner is an apparatus that sucks dust on a floor by using a vacuum generated by rotating an electric blower mounted on a main body. The vacuum cleaner includes the main body that includes the electric blower for generating a suction force and a built-in dust filter for collecting the sucked dust, a suction pipe connected to the main body, and a suction nozzle located at one end of the suction pipe to come into contact with a bottom surface.

When the vacuum cleaner operates, the vacuum generated by rotating the electric blower of the main body generates a suction force, and the generated suction force is transmitted to the suction nozzle to cause dust on the floor to be sucked into the suction pipe.

The suction nozzle is a tool that may suck the dust on the floor by coming into direct contact with the floor and may include a general suction nozzle for cleaning floors such as wooden floors or carpets, a suction nozzle for cleaning a gap between window frames and corners, a brush inlet for cleaning the carpets while scratching or brushing surfaces of the carpets, a suction nozzle for blankets with a tapping function when cleaning the blankets, a suction nozzle for water cleaning having one side that sprays detergent and the other side that sucks water, and a turbine suction nozzle that may rotate an agitator attached to the suction nozzle by installing a turbine and a belt inside the suction nozzle, and the suction nozzle of the suction pipe may be replaced with another one depending on a situation.

However, in order to replace the suction nozzle described above, it is necessary to stop the vacuum cleaner during cleaning to separate the existing suction nozzle from one end of the suction pipe, and then to fasten another suction nozzle to the suction pipe.

In other words, in order to use another suction nozzle, the vacuum cleaner has to be stopped, and thus, there is a problem that a cleaning time is delayed by the amount of stop time. In addition, there is a hassle of storing various suction nozzles separately. Because of the hassle, there is a problem that avoid cleaning for a place where cleaning is performed only by replacing the suction nozzle.

SUMMARY

The present disclosure provides a suction pipe for a vacuum cleaner which includes a front end pipe and a rear end pipe that may be easily separated from each other and which is capable of using an insertion pipe for cleaning gaps by easily separating the suction pipe.

Technical problems to be solved by the present embodiments are not limited to the technical problems described above, and there may be other technical problems.

According to a first embodiment of the present disclosure, a pipe for easy assembly and separation may include a rear end pipe formed in a cylindrical shape; an insertion pipe located at the other end of the rear end pipe; a front end pipe that is connected to the rear end pipe by inserting the insertion pipe into one end of the front end pipe; a first fixed portion located at one end of the insertion pipe; and a second fixed portion located at the front end pipe to correspond to the first fixed portion when the insertion pipe is inserted into the front end pipe, wherein the rear end pipe and the front end pipe may be fixed to each other by a magnetic force generated between the first fixed portion and the second fixed portion, the rear end pipe may have the other end that is obliquely cut, and the front end pipe may have one end that is obliquely cut to correspond to the rear end pipe.

In addition, one of the first fixed portion and the second fixed portion may be a magnet with a magnetic force, and the other may be a ferromagnetic material.

In addition, the first fixed portion and the second fixed portion may be magnets with a magnetic force and may have surfaces which face each other and have polarities different from each other.

In addition, the first fixed portion and the second fixed portion are neodymium magnets.

In addition, an outer diameter of the insertion pipe may be smaller than an outer diameter of the rear end pipe and may be the same as an inner diameter of the front end pipe.

According to a second embodiment of the present disclosure, a suction pipe for a vacuum cleaner may include the pipe for easy assembly and separation wherein the pipe for easy assembly and separation may have one end connected to a main body of the vacuum cleaner to transmit a suction force generated from the main body of the vacuum cleaner.

In addition, the insertion pipe may include a cylindrical portion having a cross-section of a cylindrical shape; and an elliptical portion that extends in a direction of the other side from the cylindrical portion and has an elliptical cross-section and has a long axis becoming longer as going from one side to the other and has a short axis becoming shorter as going from the one side to the other, and the insertion pipe may be made of a flexible material and when the insertion pipe is inserted into the front end pipe, one end of the elliptical portion is transformed into a circular shape.

In addition, when the insertion pipe is inserted into the front end pipe, an outer surface of the insertion pipe may be in close contact with an inner surface of the front end pipe.

In addition, the elliptical portion of the insertion pipe may have the other end which is obliquely cut.

In addition, a cutout portion may have one end that is obliquely cut, and the one end may be formed by being cut in a predetermined length in a longitudinal direction of the insertion pipe.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Hereinafter, embodiments of the present disclosure will be described in detail with reference to the accompanying drawings such that those skilled in the art related to the present disclosure may easily implement. However, the present disclosure may be implemented in various different forms and is not limited to the embodiments described herein. In the drawings, parts irrelevant to the description are omitted to clearly describe the present disclosure, and similar reference numerals are attached to similar components throughout the specification.

Throughout the present specification, when a component is described to be "connected" to another component, this includes not only a case in which the component is "directly connected" to another component but also a case in which the component is "electrically connected" to another component with another element interposed therebetween.

Throughout the present specification, when a member is located "on" another member, this includes not only a case in which the member is in contact with another member but also a case in which another element is interposed therebetween.

Throughout the present specification, when a certain portion "includes" a certain component, this means that other components may be further included therein rather than excluding other components unless otherwise stated. Terms such as "approximately" and "substantially" used throughout the present specification are used for a numerical value or used as meaning close to the numerical value when manufacturing and material tolerances specific to the stated meaning are presented, and the terms are used to prevent unreasonable use by unscrupulous infringers of the disclosure in which exact or absolute numerical values are described for the sake of understanding of the present disclosure. Terms "step (to)" and "step of", which are used throughout the present specification, do not mean "step for".

The present disclosure relates to a pipe that is easy to assemble and separate, and a suction pipe for a vacuum cleaner including the pipe.

Figure 1:
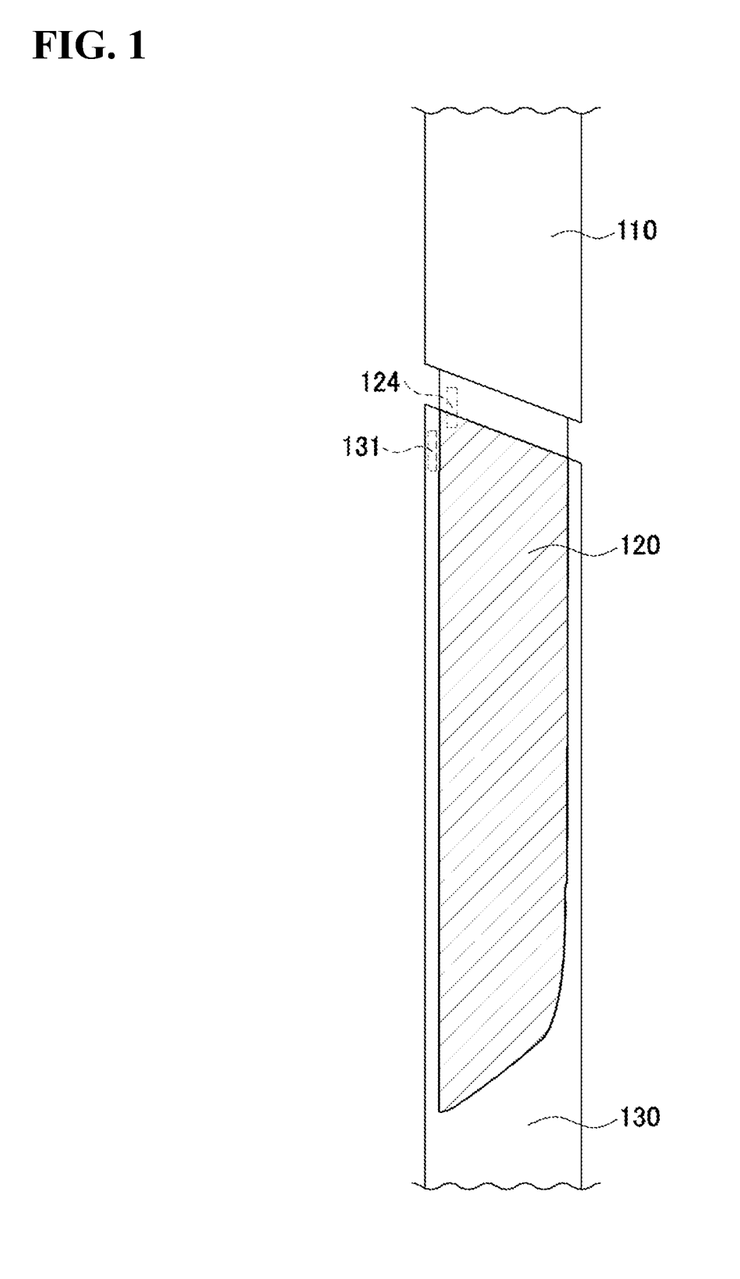
FIG. 1 is a side view of a pipe for easy assembly and separation according to an embodiment of the present disclosure.
Figure 2:
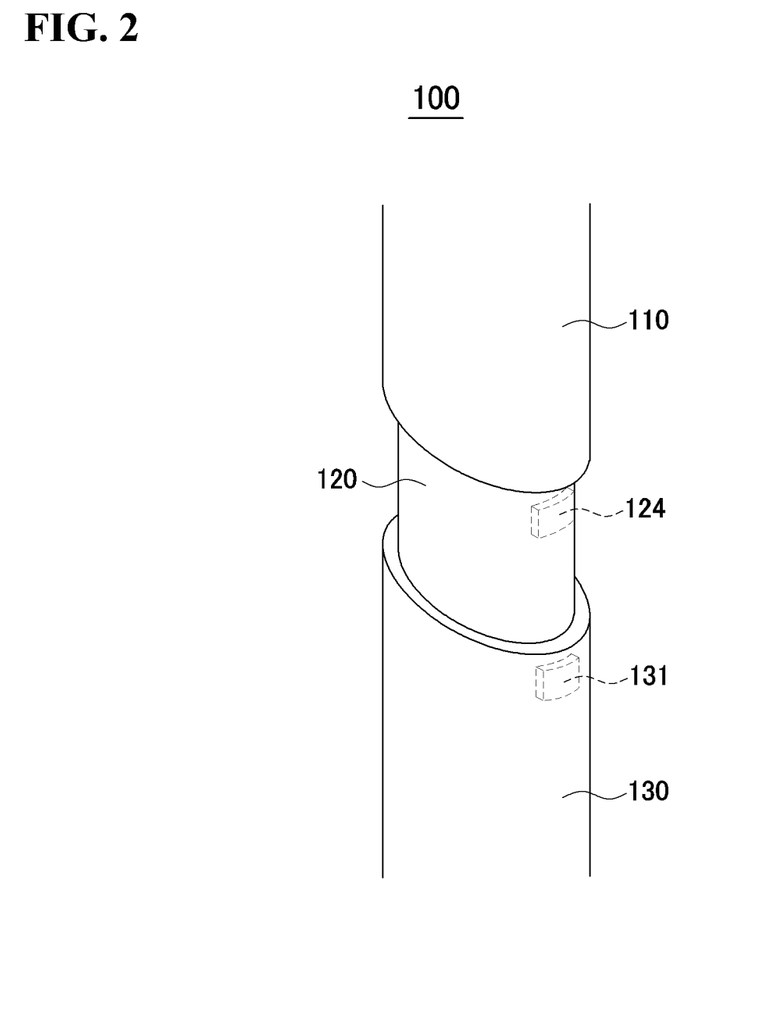
FIG. 2 is a perspective view of the pipe for easy assembly and separation according to the embodiment of the present disclosure.
Figure 3A:
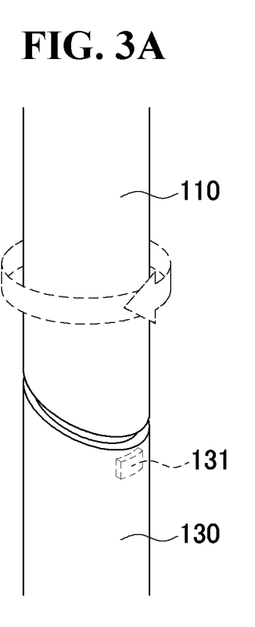
FIG. 3 illustrates views illustrating a method of assembling or separating a suction pipe according to an embodiment of the present disclosure.
Figure 3B:
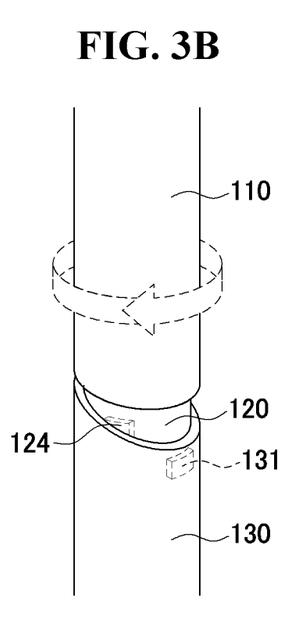
Figure 3C:
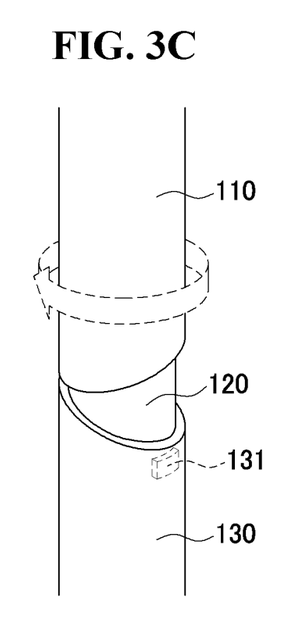
Figure 4:
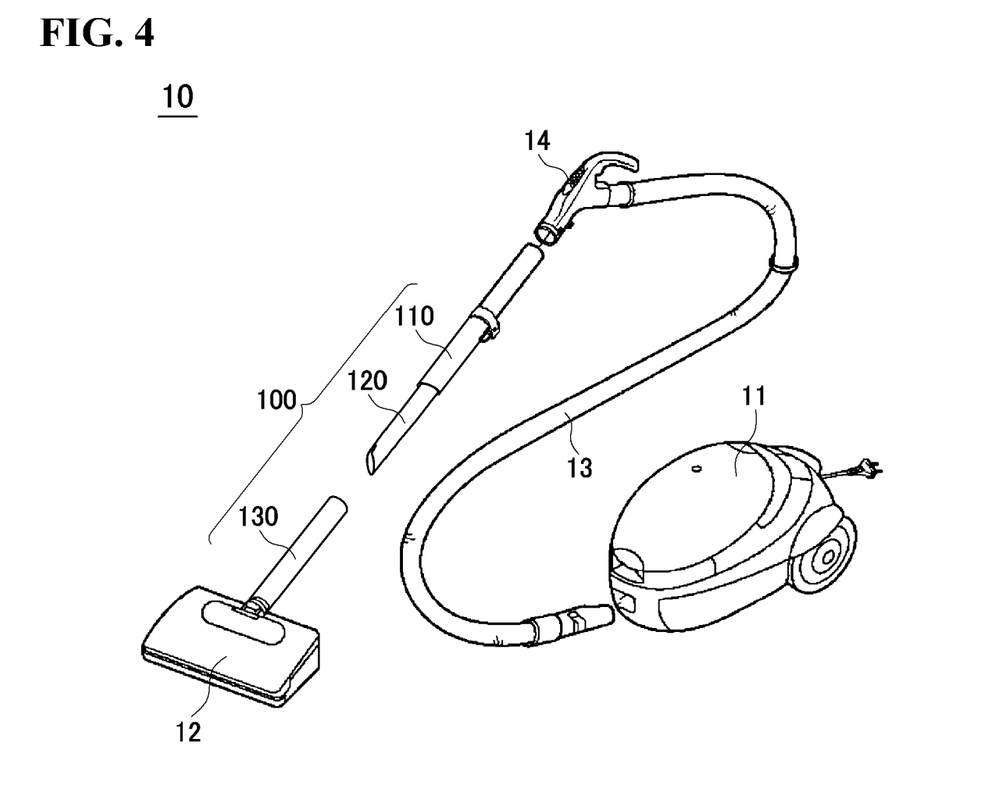
FIG. 4 is a perspective view of a vacuum cleaner equipped with a suction pipe, according to an embodiment of the present disclosure.
Figure 5:
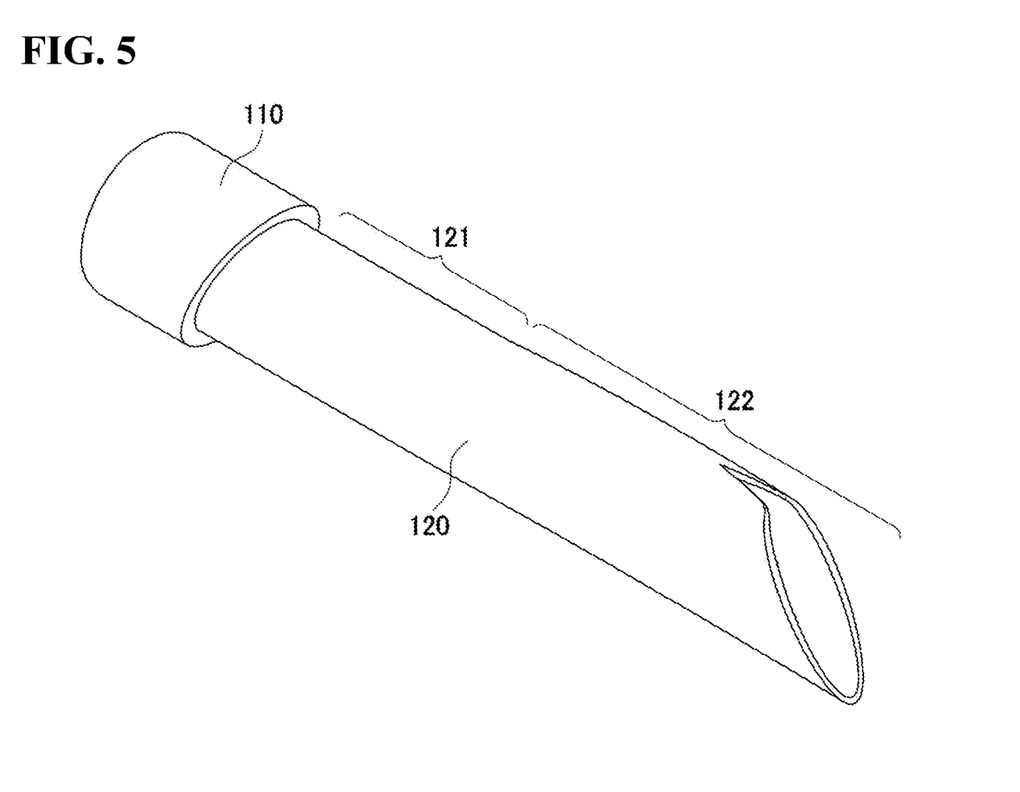
FIG. 5 is a perspective view of a rear end pipe and an insertion pipe of a suction pipe for a vacuum cleaner according to an embodiment of the present disclosure.
Figure 6A:
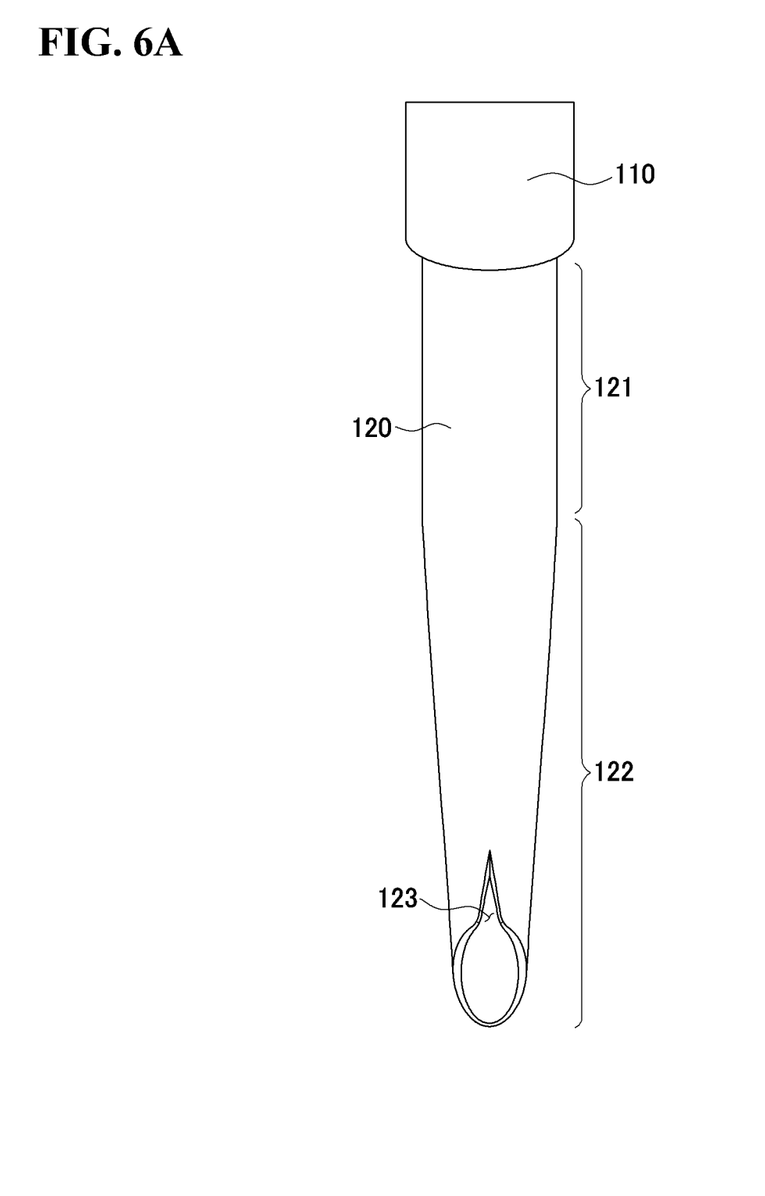
FIGS. 6A and 6B are a plan view and a front view, respectively, of the rear end pipe and the insertion pipe of the suction pipe for a vacuum cleaner according to the embodiment of the present disclosure.
Figure 6B:
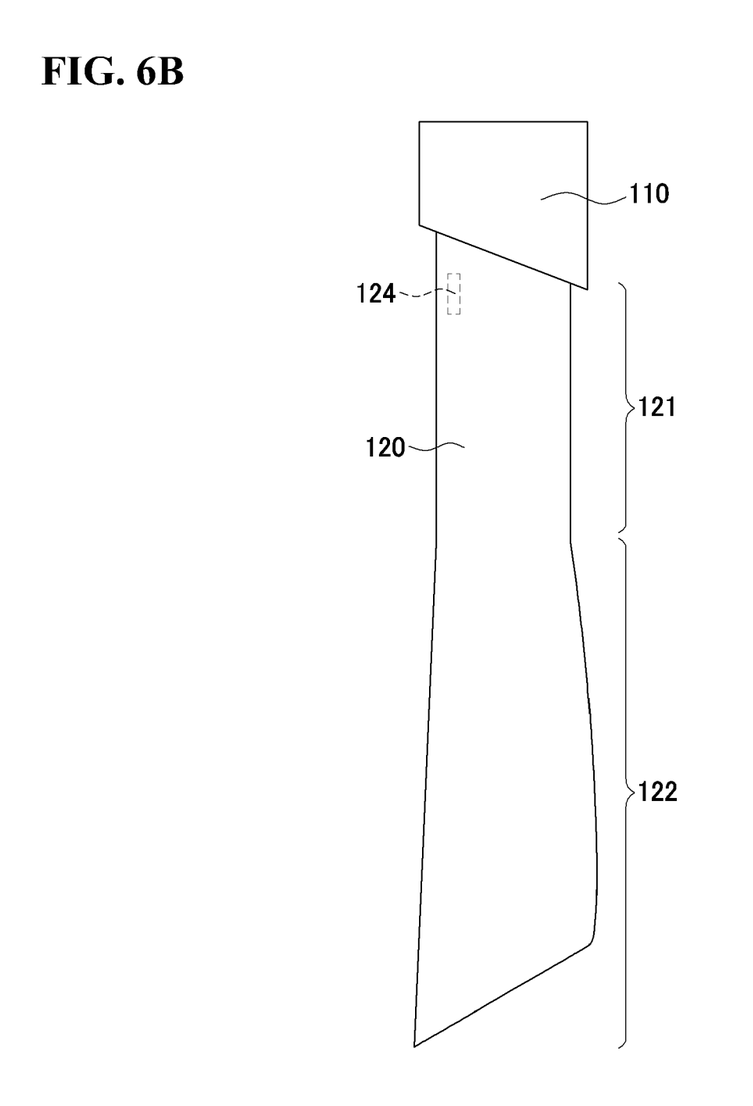
Figure 7:
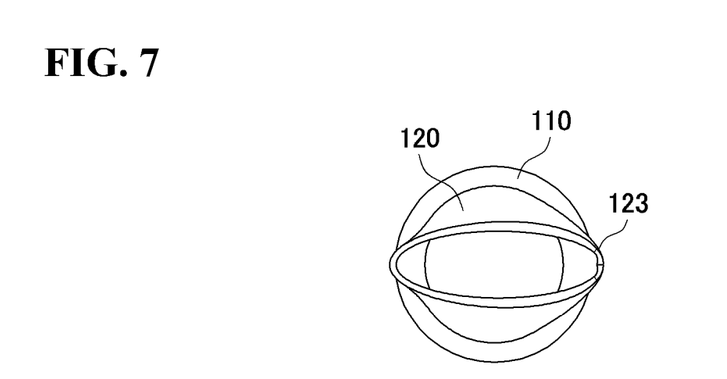
FIG. 7 is a right side view of the rear end pipe and the insertion pipe of the suction pipe for the vacuum cleaner according to the embodiment of the present disclosure.

FIG. 1 is a side view of a pipe for easy assembly and separation according to an embodiment of the present disclosure, FIG. 2 is a perspective view of the pipe for easy assembly and separation according to the embodiment of the present disclosure, FIG. 3 illustrates views illustrating a method of assembling or separating a suction pipe according to an embodiment of the present disclosure, FIG. 4 is a perspective view of a vacuum cleaner equipped with a suction pipe for a vacuum cleaner, according to an embodiment of the present disclosure, FIG. 5 is a perspective view of a rear end pipe and an insertion pipe of a suction pipe for a vacuum cleaner according to an embodiment of the present disclosure, FIGS. 6A and 6B are a plan view and a front view, respectively, of the rear end pipe and the insertion pipe of the suction pipe for a vacuum cleaner according to the embodiment of the present disclosure, and FIG. 7 is a right side view of the rear end pipe and the insertion pipe of the suction pipe for the vacuum cleaner according to the embodiment of the present disclosure.

Hereinafter, a pipe 100, which is easy to assemble and separate, according to an embodiment of the present disclosure will be described with reference to FIGS. 1 to 3.

Referring to FIG. 1, the pipe 100 that is easy to assemble and separate includes a rear end pipe 110 formed in a cylindrical shape, an insertion pipe 120 located at the other end of the rear end pipe 110, and a front end pipe 130 that has one end into which the insertion pipe 120 is inserted and is connected to the rear end pipe 110. The other end described above may indicate a 6-o'clock direction of FIG. 1, and the one end may indicate a 12-o'clock direction of FIG. 1. In other words, the front end pipe 130 and the rear end pipe 110 may communicate with each other as the insertion pipe 120 is inserted into the front end pipe 130.

In addition, the pipe, which is easy to assemble and separate, may include a first fixed portion 124 that is located at one end of the insertion pipe 120 and has magnetism and a second fixed portion 131 that is located in the front end pipe 130 to correspond to the first fixed portion 124 when the insertion pipe 120 is inserted into the front end pipe 130. In addition, the rear end pipe 110 and the front end pipe 130 may be fixed by a magnetic force generated between the first fixed portion 124 and the second fixed portion 131.

In addition, one of the first fixed portion 124 or the second fixed portion 131 may be a magnet having a magnetic force, and the other may be a ferromagnetic material. For example, when the first fixed portion 124 is a magnet, the second fixed portion 131 is a ferromagnetic material, and when a distance between the first fixed portion 124 and the second fixed portion 131 is reduced to a certain distance or less, the front end pipe 130 may be fixed without being separated from the insertion pipe 120 by pulling the second fixed portion 131 by using a magnetic force of the first fixed portion 124. In contrast to this, when the second fixed portion 131 is a magnet, the first fixed portion 124 is a ferromagnetic material, and when the distance between the first fixed portion 124 and the second fixed portion 131 is reduced to a certain distance or less, the front end pipe 130 may be fixed without being separated from the insertion pipe 120 by pulling the first fixed portion 124 by using a magnetic force of the second fixed portion 131.

However, the present disclosure is not limited thereto, and both the first fixed portion 124 and the second fixed portion 131 may be magnets having a magnetic force. In this case, the first fixed portion 124 and the second fixed portion 131 may have surfaces which face each other and have polarities different from each other. For example, the above-described magnet may be a neodium magnet but is not limited thereto.

In other words, the front end pipe 130 and the insertion pipe 120 may be fixed by the magnetic forces of the first fixed portion 124 and the second fixed portion 131, and when a user rotates the front end pipe 130 or the rear end pipe 110 by using a force greater than the magnetic force, the first fixed portion 124 and the second fixed portion 131 may be separated from each other.

An outer diameter of the insertion pipe 120 may be formed to be smaller than an outer diameter of the rear end pipe 110 and may be formed to be equal to an inner diameter of the front end pipe 130. Accordingly, when the insertion pipe 120 is inserted into the front end pipe 130, an outer surface of the insertion pipe 120 may come into close contact with an inner surface of the front end pipe 130.

Referring to FIG. 2, the rear end pipe 110 may have a shape in which the other end is obliquely cut, and the front end pipe 130 may have a shape in which one end is obliquely cut to correspond to the rear end pipe 110.

Referring to FIG. 3, when the suction pipe 100 is separated, the rear end pipe 110 and the front end pipe 130 are separated from each other by rotating the rear end pipe 110 or the front end pipe 130, and accordingly, there is an effect that the front end pipe 130 may be easily separated.

Referring to FIG. 4, the pipe 100 for easy assembly and separation according to the present disclosure may be a suction pipe 100 having one end that is connected to a main body 11 of a vacuum cleaner 10 and transmits a suction force generated by the main body 11 of the vacuum cleaner 10.

Hereinafter, the suction pipe 100 for a vacuum cleaner according to an embodiment of the present disclosure will be described with reference to FIGS. 4 to 7.

Referring to FIG. 4, the vacuum cleaner 10 is an apparatus that sucks dust on a floor by using a vacuum generated by rotation of an electric blower mounted on the main body 11.

The vacuum cleaner 10 may include a suction nozzle 12 that comes into contact with a bottom surface to suck dust, the suction pipe 100 connected to the suction nozzle 12, a hose portion 13 that is connected between the suction pipe 100 and the main body 11 and is formed of a flexible material, and the main body 11 that includes an electric blower for generating a suction force of the vacuum cleaner and a built-in dust filter for collecting the sucked dust.

When the vacuum cleaner operates, the electric blower of the main body 11 may rotate to generate a vacuum for generating a suction force, and the generated suction force may be sequentially transmitted to the hose portion 13, the suction pipe 100, and the suction nozzle 12 to suck dust on the floor.

In addition, a handle 14 may be formed at an end of the hose portion 13, and a controller for adjusting the suction force may be located in the handle 14.

The vacuum cleaner 10 illustrated in FIG. 4 may be a wired cleaner generally used at home, and the present disclosure may include the suction pipe 100 mounted in a handy vacuum cleaner 10 used wirelessly. In the handy vacuum cleaner 10, the suction pipe 100 may be directly connected to the main body 11 to transmit a suction force generated by the main body 11 to the suction nozzle 12.

Referring to FIG. 4, the rear end pipe 110 may have a cylindrical shape, and one end thereof may be connected to the main body 11 or the hose portion 13 of the vacuum cleaner 10.

Referring to FIGS. 5 to 6B, the insertion pipe 120 may include a cylindrical portion 121 having a cross-section of a cylindrical shape, and an elliptical portion 122 that extends in a direction of the other side from the cylindrical portion 121 and has an elliptical cross-section and has a long axis becoming longer as going from one side to the other and has a short axis becoming shorter as going from the one side to the other. That is, the insertion pipe 120 may have the other end formed in an elliptical cylindrical shape, and thereby, it is possible to easily clean a window frame or a gap.

In addition, the insertion pipe 120 may be made of a flexible material, and the end of the elliptical portion 122 may be transformed into a circular shape when inserted into the front end pipe 130. In addition, when the insertion pipe 120 is separated from the front end pipe 130, the insertion pipe 120 may return to an original shape by a restoring force.

In addition, an outer circumferential length of the insertion pipe 120 may be the same as an inner circumferential length of the front end pipe 130. In addition, an outer circumferential length of the cylindrical portion 121 may be the same as an outer circumferential length of the elliptical portion 122, and thereby, when the insertion pipe 120 is inserted into the front end pipe 130, an outer surface of the insertion pipe 120 may be in close contact with an inner surface of the front end pipe 130 such that air may smoothly pass through the suction pipe 100. However, the present disclosure is not limited thereto, and a stepped portion may be formed in the inside of the front end pipe 130 such that the insertion pipe 120 is inserted into the stepped portion of the front end pipe 130, and in this case, an inner diameter of the insertion pipe 120 may also be the same as an inner diameter of the front end pipe 130.

Referring to FIG. 6B, the elliptical portion 122 of the insertion pipe 120 may have a shape in which the other end thereof is obliquely cut. The other end of the elliptical portion 122 may be in the 6-o'clock direction of FIG. 3. Accordingly, the insertion pipe 120 may be easily inserted into the front end pipe 130, and an opening formed at the other end of the insertion pipe 120 may be formed to be larger such that foreign matter may be more smoothly sucked therein.

In addition, referring to FIG. 6A, the elliptical portion 122 may include a cutout portion 123, which is formed by being cut in a predetermined length in the longitudinal direction of the insertion pipe 120, at one end of the obliquely cut portion. The one end may indicate the 12-o'clock direction of FIG. 3. In other words, as the cutout portion 123 is formed at the other end of the insertion pipe 120, the opening formed at the other end of the insertion pipe 120 may be more expanded, and thus, foreign matter may be more smoothly sucked, and when the insertion pipe 120 is inserted into the front end pipe 130, there is an effect that the other end of the insertion pipe 120 may be easily transformed.

The above description of the present disclosure is for illustrative purposes only, and those skilled in the art related to the present disclosure will be able to understand that the present embodiments may be easily modified into other specific forms without changing the technical idea or essential features of the present disclosure. Therefore, it should be understood that the embodiments described above are illustrative and non-limiting in all respects. For example, each component described as a single type may also be implemented in a distributed manner, and similarly, components described in a distributed manner may also be implemented in a combined form.

The scope of the present disclosure is indicated by the claims to be described below rather than the above detailed description, and all changes or modifications derived from the meaning and scope of the claims and their equivalent concepts should be construed as being included in the scope of the present disclosure.

SIGNS LIST

10: vacuum cleaner
11: main body
12: suction nozzle

100: pipe or suction pipe for easy assembly and separation
110: rear end pipe
120: insertion pipe
121: cylindrical portion
122: elliptical portion
123: cutout portion
124: first fixed portion
130: front end pipe
131: second fixed portion

What is claimed is:

1. A suction pipe for a vacuum cleaner, the suction pipe comprising:
    a rear end pipe formed in a cylindrical shape;
    an insertion pipe located at the other end of the rear end pipe;
    a front end pipe that is connected to the rear end pipe by inserting the insertion pipe into one end of the front end pipe;
    a first fixed portion located at one end of the insertion pipe; and
    a second fixed portion located at the front end pipe to correspond to the first fixed portion when the insertion pipe is inserted into the front end pipe,
    wherein the rear end pipe and the front end pipe are fixed to each other by a magnetic force generated between the first fixed portion and the second fixed portion,
    the rear end pipe has the other end that is obliquely cut, and
    the front end pipe has one end that is obliquely cut to correspond to the rear end pipe,
    wherein the insertion pipe comprises:
    a cylindrical portion having a cross-section of a cylindrical shape; and
    an elliptical portion that extends in a direction of the other side from the cylindrical portion and has an elliptical cross-section and has a long axis becoming longer as going from one side to the other and has a short axis becoming shorter as going from the one side to the other,
    wherein the insertion pipe is made of a flexible material and when the insertion pipe is inserted into the front end pipe, one end of the elliptical portion is transformed into a circular shape, and
    wherein the pipe for easy assembly and separation has one end connected to a main body of the vacuum cleaner to transmit a suction force generated from the main body of the vacuum cleaner.

2. The pipe of claim 1, wherein, when the insertion pipe is inserted into the front end pipe, an outer surface of the insertion pipe is in close contact with an inner surface of the front end pipe.

3. The pipe of claim 1, wherein the elliptical portion of the insertion pipe has the other end which is obliquely cut.

4. The pipe of claim 3, wherein a cutout portion has one end that is obliquely cut, and the one end is formed by being cut in a longitudinal direction of the insertion pipe.

5. The pipe of claim 1, wherein one of the first fixed portion and the second fixed portion is a magnet with a magnetic force, and the other is a ferromagnetic material.

6. The pipe of claim 1, wherein the first fixed portion and the second fixed portion are magnets with a magnetic force and have surfaces which face each other and have polarities different from each other.

7. The pipe of claim 1, wherein the first fixed portion and the second fixed portion are neodymium magnets.

8. The pipe of claim 1, wherein an outer diameter of the insertion pipe is smaller than an outer diameter of the rear end pipe and is the same as an inner diameter of the front end pipe.

* * * * *